G. F. MILLER.
FILTER PRESS PLATE.
APPLICATION FILED JAN. 22, 1919.
1,308,438.
Patented July 1, 1919.
2 SHEETS—SHEET 1.
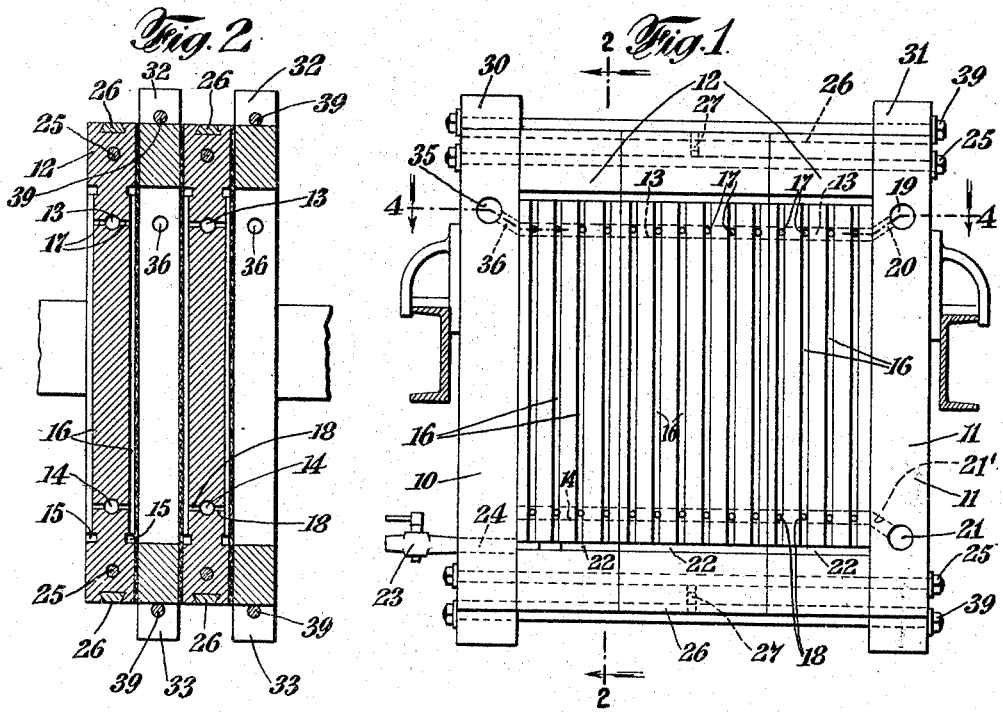
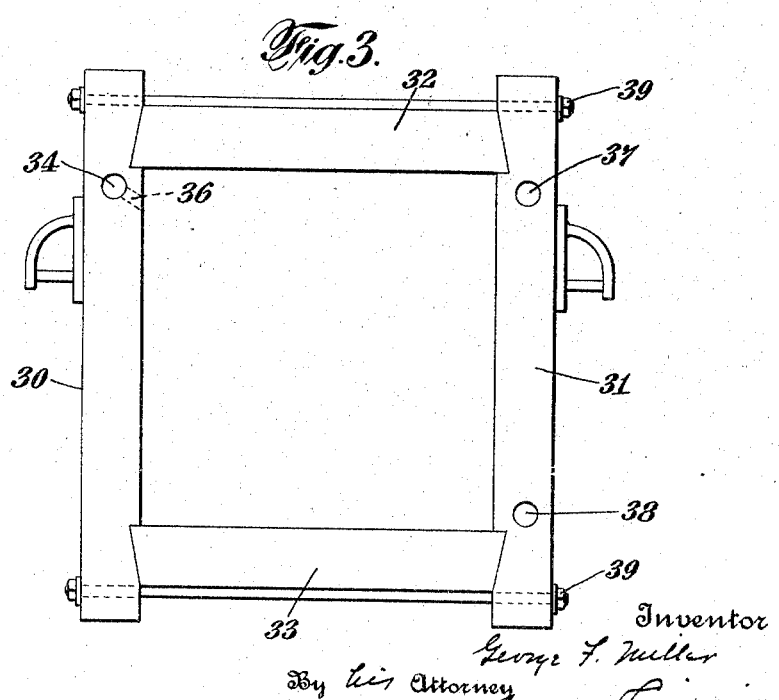
Inventor
George F. Miller
By his Attorney G. F. MILLER.
FILTER PRESS PLATE.
APPLICATION FILED JAN. 22, 1919.
1,308,438.
Patented July 1, 1919.
2 SHEETS—SHEET 2.
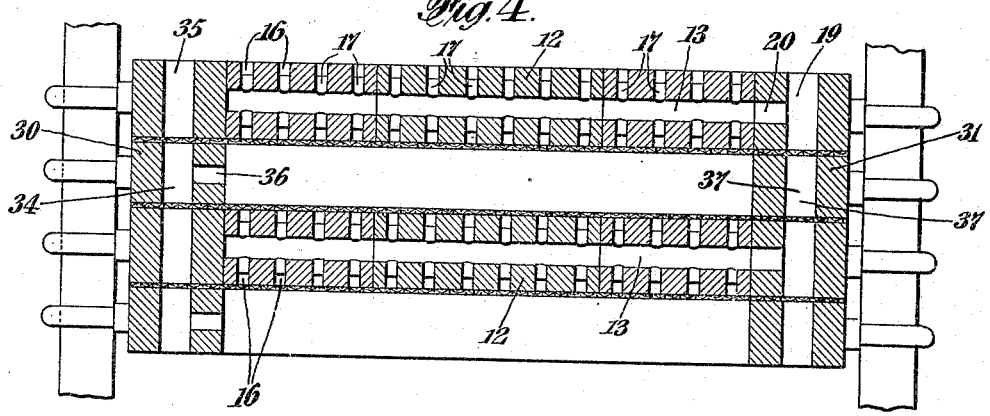
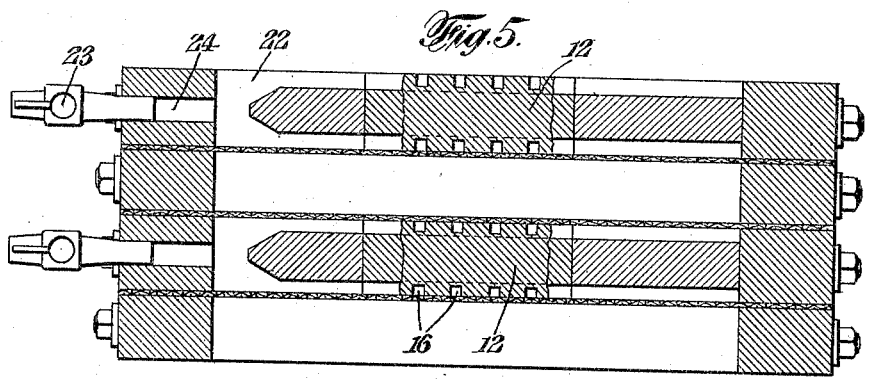
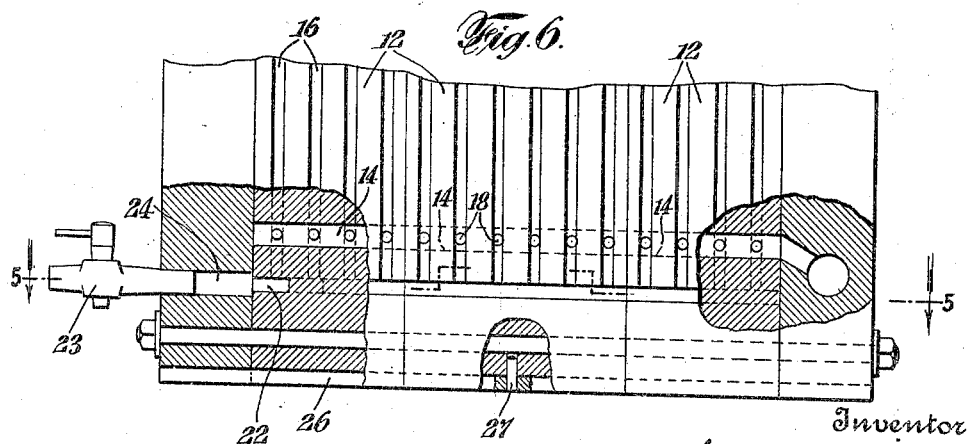
Inventor
George F. Miller
By his Attorney

UNITED STATES PATENT OFFICE.

GEORGE F. MILLER, OF NEW YORK, N. Y.

FILTER-PRESS PLATE.

1,308,438.  Specification of Letters Patent.  Patented July 1, 1919.

Application filed January 22, 1919. Serial No. 272,484.

*To all whom it may concern:*

Be it known that I, GEORGE F. MILLER, a citizen of the United States, residing in the city of New York, county of New York, borough of Manhattan, and State of New York, have invented certain new and useful Improvements in Filter-Press Plates, of which the following is a full, clear, and exact specification.

My invention relates to filter press parts and refers particularly to filter press plates.

The object of my invention is a filter-press plate of such construction as to prevent the twisting, warping and buckling of its several pieces, especially when composed of wood.

This and other objects of my invention will be evident upon a consideration of my specification, drawings and claims.

The ordinary wooden filter press plates are composed of a series of elements comprising a frame and a contained field. In the use of the filter press, these plates are placed in a series with filter press frames between the plates and by a series of conduits the mass to be filtered is forced into the spaces between the plates and the frames, the solid substances of the mass being retained between filter cloth, while the liquid is allowed to escape from the press. A washing liquid is then forced through the retained mass in order to free it from the original liquid. During these processes the wooden plates become thoroughly impregnated with liquid and when they are removed for the purpose of recovering the filtered mass, they are liable to twist, warp and buckle due to their becoming dry or partially dry. This is particularly true owing to the fact that they are composed of a number of wooden elements which have a tendency to warp on account of their different shapes and fiber compositions.

This warping is of the greatest disadvantage because unless they are perfectly true in their formation they will not fit tightly against the fiter-press frames, the liquid and material will escape from between the plates and the frames and the object of the filtering process will be defeated.

The device of my invention overcomes this difficulty and presents a plate which is not subject to this warping tendency, thus preventing the loss of the plates and insuring efficient filtering.

In a broad way, my invention comprises a filter-plate carrying reinforcing members to prevent warping.

In the accompanying drawings, illustrating one form of my device, similar parts are designated by similar numerals.

Figure 1 is a vertical plan view of a series of filter-press frames and a filter-press plate of my invention.

Fig. 2 is a section through the line 2—2 of Fig. 1.

Fig. 3 is a vertical plan view of a filter-press frame.

Fig. 4 is a section through the line 4—4 of Fig. 1.

Fig. 5 is a section through the line 5—5 of Fig. 6.

Fig. 6 is a broken vertical section, of one of my plates, partly broken away.

The particular filter-press plate of my invention, illustrated in the accompanying drawings, comprises a frame composed of the sides 10 and 11 and the three central members 12, 12, 12. In the upper portion of each member 12 is a conduit 13 in alinement with the conduit 13 of the abutting member 12. In the lower portion of each member 12 is a conduit 14 in alinement with the conduit 14 of the abutting member 12. Upon each face of the members 12, 12 is a recess 15, and a series of parallel grooves 16, thus forming a grooved plate field. A series of conduits 17, 17 connect the conduits 13 13 with the grooves, and a series of conduits 18, 18 connect the conduit 14, 14 with the grooves. Within the side 11 is a conduit 19 connected by means of the conduit 20 to the conduit 13 and a conduit 21 connected by means of the conduit 21' with the conduit 14. A conduit 22 at the lower portion of the field is connected to the faucet 23 by means of the conduit 20 in the side 10.

In order to assemble the various members of the plate, the sides 10 and 11 and the members 12, 12, 12 are clamped together by the stay-bars 25, 25. This is the usual form of plate which twists and warps during its use, thus rendering it useless. In order to overcome this objectionable feature, I embed or dovetail in the upper and lower portions of the plate, a reinforcing member 26 which is preferably made of harder wood than the remainder of the plate and further enforce it by means of a dowel pin 27. By the use of this reinforcing member 26 of my invention, the various members are held in alinement and are prevented from warping during their repeated subjection to liquids with subsequent drying.

In order that the arrangement of the several parts of the assembled filter may be understood, I show an ordinary filter frame, Fig. 3, comprising the sides 30 and 31, the top 32 and the bottom 33, the side 30 having the conduit 34 in alinement with the conduit 35 of the plate and connected to the interior of the frame by the conduit 36. The side 31 contains the conduits 37 and 38 in alinement with the conduits 19 and 21 of the plates respectively. The frame is held together by the stay-bars 39, 39.

The several members of the plate may be of different shape and number from those illustrated, as the essence of my invention rests in the inserted reinforcing members 26, 26.

I do not limit myself to the particular size, shape, number or arrangement of parts as shown and described, all of which may be varied without going beyond the scope of my invention as described and claimed.

What I claim is:

1. In a filter press plate, in combination, side members, a central field, a reinforcing member dove-tailed into the upper portions of the side members, and a reinforcing member dove-tailed into the lower portions of the side members.

2. In a filter press plate, in combination, side members, a central field and reinforcing members dove-tailed into and connecting the side members.

3. In a filter press plate, in combination, side members, a central field, a reinforcing member dove-tailed into the upper portions of the side members, a reinforcing member dove-tailed into the lower portions of the side members and means for preventing lateral movement of the reinforcing members.

4. In a filter press plate, in combination, side members, a central field, reinforcing members dove-tailed into and connecting the side members and means for preventing lateral movement of the reinforcing members.

5. In a filter-press plate, in combination, side members, a central member, a reinforcing member dove-tailed into the side members and the central member at the top of the plate and a reinforcing member dove-tailed into the side members and the central member at the bottom of the plate.

6. In a filter-press plate, in combination, side members, a central field-carrying member and a reinforcing member dove-tailed into the side members and the field-carrying member.

7. In a wooden filter-press plate, in combination, side members, a central field-carrying member and a reinforcing member embedded within the side members and the central field-carrying member.

8. In a wooden filter-press plate, in combination, side members, a central field-carrying member and a reinforcing member composed of harder wood than the other elements of the plate embedded within the side members and the central field-carrying member.

9. In a wooden filter-press plate, in combination, side members, a series of central members, wooden reinforcing members embedded within the side members and the central members at opposite ends of the plate.

10. In a filter-press plate, in combination, side members, a central field-carrying member, a reinforcing member dove-tailed into the side members and the field-carrying member and means for fastening the reinforcing member to the other elements.

Signed at New York city in the county of New York and State of New York this 17th day of January, 1919.

GEORGE F. MILLER.

Copies of this patent may be obtained for five cents each, by addressing the "Commissioner of Patents, Washington, D. C."